(12) United States Patent
Koskinen et al.

(10) Patent No.: US 7,558,566 B2
(45) Date of Patent: Jul. 7, 2009

(54) METHOD FOR INFORMING ABOUT THE PROPERTIES OF A COMMUNICATION NETWORK, A SYSTEM AND A MOBILE TERMINAL

(75) Inventors: Topi Koskinen, Tampere (FI); Minna Asikainen, Tampere (FI); Päivi Jokinen, Tampere (FI); Sami Nyyssönen, Ylöjärvi (FI)

(73) Assignee: Nokia Corporation, Espoo (FI)

( * ) Notice: Subject to any disclaimer, the term of this patent is extended or adjusted under 35 U.S.C. 154(b) by 296 days.

(21) Appl. No.: 10/118,668

(22) Filed: Apr. 8, 2002

(65) Prior Publication Data

US 2002/0168969 A1     Nov. 14, 2002

(30) Foreign Application Priority Data

May 8, 2001   (FI) ................................ 20010961

(51) Int. Cl.
*H04W 24/00* (2006.01)
*H04M 11/04* (2006.01)

(52) U.S. Cl. .................................... 455/424; 455/456.3
(58) Field of Classification Search ......... 455/423–425, 455/456.1, 456.6, 522, 67.11, 67.13, 67.16, 455/69, 115.1–115.4, 226.1–226.4
See application file for complete search history.

(56) References Cited

U.S. PATENT DOCUMENTS 5,778,304 A * 7/1998 Grube et al. ............. 455/456.4
6,101,387 A   8/2000 Granberg et al.
6,564,057 B1 * 5/2003 Chun et al. ................. 455/437
6,628,938 B1 * 9/2003 Rachabathuni et al. ... 455/456.3
6,937,869 B1 * 8/2005 Rayburn ..................... 455/457
2002/0107023 A1 * 8/2002 Chari et al. ................. 455/445

FOREIGN PATENT DOCUMENTS

| DE | 19819582 | 11/1999 |
|---|---|---|
| EP | 1102085 | 5/2001 |
| WO | 0036853 | 6/2000 |

* cited by examiner

*Primary Examiner*—Alexander Eisen
*Assistant Examiner*—Michael T Thier
(74) *Attorney, Agent, or Firm*—Ware, Fressola, Van Der Sluys & Adolphson LLP

(57) ABSTRACT

The invention relates to a method for informing a mobile terminal (MT) about the properties of a communication network (NW). The communication network (NW) comprises at least two base transceiver stations (BTS) which form at least two cells (C1-C9) whose properties affect the functions of the mobile terminal (MT) available in the range of the cell (C1-C9). The current serving base station is at least one base station (BTS) of the cell, through which the connection between the mobile terminal (MT) and the communication network (NW) is maintained. In the method, the location of the mobile terminal (MT) is determined, the properties of the cell (C1-C9) formed by at least said serving base station are examined, and information about at least one determined property of the cell (C1-C9) is transmitted to the mobile terminal (MT).

26 Claims, 4 Drawing Sheets

METHOD FOR INFORMING ABOUT THE PROPERTIES OF A COMMUNICATION NETWORK, A SYSTEM AND A MOBILE TERMINAL

TECHNICAL FIELD OF THE INVENTION

The present invention relates to a method for informing about the properties of a communication network, a system and a mobile terminal.

BACKGROUND OF THE INVENTION

The present invention relates to a method for informing a mobile terminal about the properties of a communication network, which communication network comprises at least two base transceiver stations which form at least two cells whose properties affect the functions available in the mobile terminal within the cell, and in which the current serving base station is at least one base station of the cell, through which the connection between the mobile terminal and the communication network is maintained. The invention also relates to a system comprising a mobile terminal, means for informing the mobile terminal about the properties of a communication network, which communication network comprises at least two base transceiver stations which form at least two cells whose properties affect the functions available in the mobile terminal within the cell, and in which the current serving base station is arranged to be at least one base station of the cell, through which the connection between the mobile terminal and the communication network is arranged to be maintained. The invention further relates to a mobile terminal comprising means for receiving information about at least one property of a communication network in the mobile terminal, which communication network comprises at least two base transceiver stations which form at least two cells whose properties affect the functions available in the mobile terminal within the cell, and in which the current serving base station is arranged to be at least one base station of the cell, through which the connection between the mobile terminal and the communication network is arranged to be maintained.

In addition to a conventional circuit switched connection, the option of a packet switched connection has been developed for mobile communication systems, such as the GSM mobile communication system. In the GSM mobile communication system, such a service is the so-called general packet radio service (GPRS). The GPRS makes it possible to use e.g. the Internet Protocol (IP) as well as the X.25 communication protocol, to transmit short messages (SMS, Short Message Service), to transmit e-mail, as well as to use WAP applications (Wireless Application Protocol). Such a packet data transmission connection provides a communication method which is more efficient than the circuit switched connection, particularly for asynchronic data transmission, because to use the packet switched connection, the resources of the mobile communication system are not allocated for the whole time of the connection but only for the time needed for the transmission of the packets. In the circuit switched connection, however, the connection is allocated for the whole time when it is on. By means of the packet switched connection, the user of a mobile terminal can, for example, keep an e-mail application activated all the time, wherein the user will notice an incoming e-mail message at once. Because the packet switched connection only allocates resources according to the need, it may also be less expensive as to the call costs when compared with a situation of using a circuit switched connection.

In the GPRS system, three operating modes are defined for the mobile terminal: class A, class B, and class C. The mobile terminals can be classified into these categories according to the type of packet network properties implemented in them. Mobile terminals of class A can employ GPRS services and other GSM services simultaneously. Mobile terminals of class B can simultaneously monitor signals on the control channels of the GPRS network and the GSM network, but they can only use either GPRS services or GSM services at a time. Mobile terminals of class C can use a circuit switched connection and a packet switched GPRS connection, but not simultaneously.

In practice, a mobile terminal of class B can receive messages related to the setting up of a circuit switched connection also when the mobile terminal is using GPRS services, for example when a packet connection is active for using a WAP browser. The mobile terminal can then e.g. receive a message informing about an incoming call (CS paging), but it cannot operate in a circuit switched connection and in a packet switched connection at the same time. Thus, in a situation of an incoming message for the mobile terminal, related to a circuit switched connection, the packet connection is set pending for the time of receiving the message and for the time of a circuit switched connection which is possibly formed, until the circuit switched connection is terminated. In an ideal situation, this means that the mobile terminal can change its mode between the packet switched connection and the circuit switched connection and, after the change, continue from the mode in which the mobile terminal was at the time of the interruption. However, it has been found in practice that applications using a packet switched connection, such as e-mail or e.g. the FTP application used for the transmission of data files, are disconnected even after a relatively short interruption of the connection. For example, in some known e-mail protocols, such as POP3 (Post Office Protocol) and IMAP4 (Internet Message Access Protocol), messages must be transmitted at intervals during the connection, to prevent disconnection. Such a property is used e.g. to prevent the connection from being left redundantly active. If the e-mail server does not receive such a message within a predetermined time, the server will determine that the communication has been cut off or the terminal is no longer in operation, wherein the server disconnects the connection. When using the POP3 protocol, the connection can be disconnected even after an interruption of about 10 minutes, and when using the IMAP4 protocol, an interruption of about 30 minutes may cause disconnection of the e-mail connection. After the disconnection, the user must re-establish the e-mail connection and give his/her user identification and password, which will retard the use of the e-mail application.

Thus, in a situation in which the packet switched connection is active in the mobile terminal and there is an incoming call for the mobile terminal, the packet connection is set pending. Thus, the above-mentioned messages for maintaining the packet connection cannot be transmitted from mobile terminals of prior art, wherein the packet connection may be disconnected. The packet connection may be disconnected even during a considerably shorter call than the above mentioned 10 or 30 minutes. This is possible e.g. when there is an incoming call just a moment before the message to maintain the connection is due for transmission. It is even possible that the connection is disconnected before the user has had time to answer the call.

The above-mentioned problem also occurs in a situation in which the user of the mobile terminal sets up a circuit switched connection, e.g. a voice call, in a situation in which the packet connection is active in the mobile terminal. Also in this case, the circuit switched connection prevents the transmission of messages to maintain the packet connection, which may result in the disconnection of the packet connection during even a short call. One possibility to prevent the disconnection of the packet connection is thus to start the call first after the message to maintain the packet connection has been transmitted. However, the user does not necessarily even know about such a property, and on the other hand, it is not appropriate to presuppose that the user always remembers, when making a call, to first transmit a message to maintain the packet connection.

In practice, different mobile communication networks may also have different properties. Thus, some mobile communication networks implement the properties of all the above-mentioned classes A, B and C, but some mobile communication networks implement the properties of only one such class, e.g. class C. Moreover, the properties of even the same mobile communication network may change when moving from the range of one cell to the range of another cell. For example, in third generation mobile communication networks under development, such as the UMTS (Universal Mobile Telecommunication System), quality of service levels are defined for various connections. However, all the defined quality of service levels are not necessarily implemented in all the cells of such a mobile communication network. Thus, situations may occur, in which all the services available for a mobile terminal cannot be guaranteed for it. As a result, an active connection may be disconnected when the mobile terminal moves from the range of one mobile communication network to the range of another mobile communication network, or even from the range of one cell to the range of another cell. For example, if the user has a video call active within the range of a cell, and if the mobile terminal moves to the range of such a cell which does not support the video call property, the video call will be disconnected. Such a disconnection may cause considerable harm for the user of the mobile terminal, because the disconnection cannot be anticipated in solutions of prior art.

In mobile communication networks, a cell refers to the geographical area in which the signal of the base station of the mobile communication network is sufficiently strong to maintain a connection between the mobile communication network and the mobile terminal. For example, in GSM mobile communication networks, the radius of such an area covered by the cell is typically in the order of 35 km around the base station. However, in practice, the size of the cell may be affected by topography and climatic conditions, wherein the cell may be locally smaller or larger than the average cell size. Furthermore, particularly in urban areas, the cell size can be reduced and several cells can be provided in urban areas, wherein the capacity of the mobile communication network can be increased in such areas to some extent.

In this description, a base station via which the mobile terminal communicates with the mobile communication network is referred to as a serving base station. Such a serving base station is not necessarily always the base station closest to the mobile terminal. The serving base station may also be changed, for example, in a situation in which the mobile terminal moves from the range of one cell to the range of another cell. If the serving base station is not the base station closest to the location of the mobile terminal, the mobile communication network can, for example, reduce the transmission power of the closer base stations and/or increase the transmission power of the serving base station, so that the signals of the closer base stations would not disturb the connection between the serving base station and the mobile terminal. In some cases, the connection between a more distant serving base station and the mobile terminal can also be arranged in such a way that the signals to be transmitted in the connection between the serving base station and the mobile terminal are linked via one or more base stations. In some mobile communication networks, such as the UMTS (Universal Mobile Telecommunication System), there can be several serving base stations simultaneously, wherein substantially the same information is transmitted from several base stations to the mobile terminal. Such a group of serving base stations is also called an active set.

The communication network can also be another communication network, such as a wireless local area network WLAN. Thus, also the base station can be other than a base station in a mobile communication network, such as an access point in a wireless local area network, or the like. Furthermore, the communication network may comprise several communication networks which may also be different from each other.

SUMMARY OF THE INVENTION

It is an aim of the present invention to provide a method and a system as well as a mobile terminal, in which the user can be informed in advance about possible changes in the properties of a mobile communication network and their effect on the connections, wherein the user can be prepared for these changes in the properties well in advance. The invention is based on the idea that the user's location is determined and the user is informed particularly about the properties of the cells in the neighbouring area. In this informing about the properties, it is possible to use e.g. the user's travel route as auxiliary information, if necessary. To put it more precisely, the method according to the present invention is primarily characterized in that in the method, the location of the mobile terminal is determined, the properties of the cell formed by at least said serving base station are examined, and information about at least one determined property of the cell is transmitted to the mobile terminal. The system according to the present invention is characterized in that the system also comprises at least means for determining the location of the mobile terminal, means for examining the properties of the cell formed by at least said serving base station, and means for transmitting information about at least one determined property of the cell to the mobile terminal. Furthermore, the terminal according to the present invention is characterized in that the terminal also comprises at least means for determining the location of the mobile terminal, means for transmitting information about the location of the mobile terminal to the mobile communication network, which has means for determining the properties of the cell formed by at least said serving base station, and which terminal comprises means for receiving information about at least one determined property of the cell from the mobile communication network.

Considerable advantages are achieved by the present invention. When applying the method of the invention, it is possible to avoid sudden disconnections particularly in situations in which the user is moving and may transfer from the range of one cell to the range of another cell, or even transfer to the range of another mobile communication network. By the method of the invention, the user can be informed particularly about the properties of the cells in the neighbouring area. Thus, the user can take into account the properties of the cells in the design and realization of his/her travel route and select such a route where the required properties are available. In this application, to facilitate the selection of the route, it is possible to present, e.g. on the display of the terminal, a map depicting the locations of suitable cells. The user may also decide not to establish a connection which would be interrupted when s/he moves from the range of one cell to the range of another cell. In addition, the user can be informed of such cells in which the properties required by one or more connections needed by the user are available and which are not available in the cell corresponding to the user's current location. Thus, on the basis of this information, the user can move to the range of such a cell where the one or more connections needed by him/her can be set up. Thus, the probability of unforeseen interruption of active connections is significantly lower than in solutions of prior art. Furthermore, the invention makes it possible to inform the user about the properties of the cell, in whose range the mobile terminal is located, already at the stage of activating the mobile terminal. The user will thus know which applications and what types of connections can be started in the mobile terminal.

DESCRIPTION OF THE DRAWINGS

In the following, the invention will be described in more detail with reference to the appended drawings, in which.

DETAILED DESCRIPTION OF THE INVENTION

Figure 1:
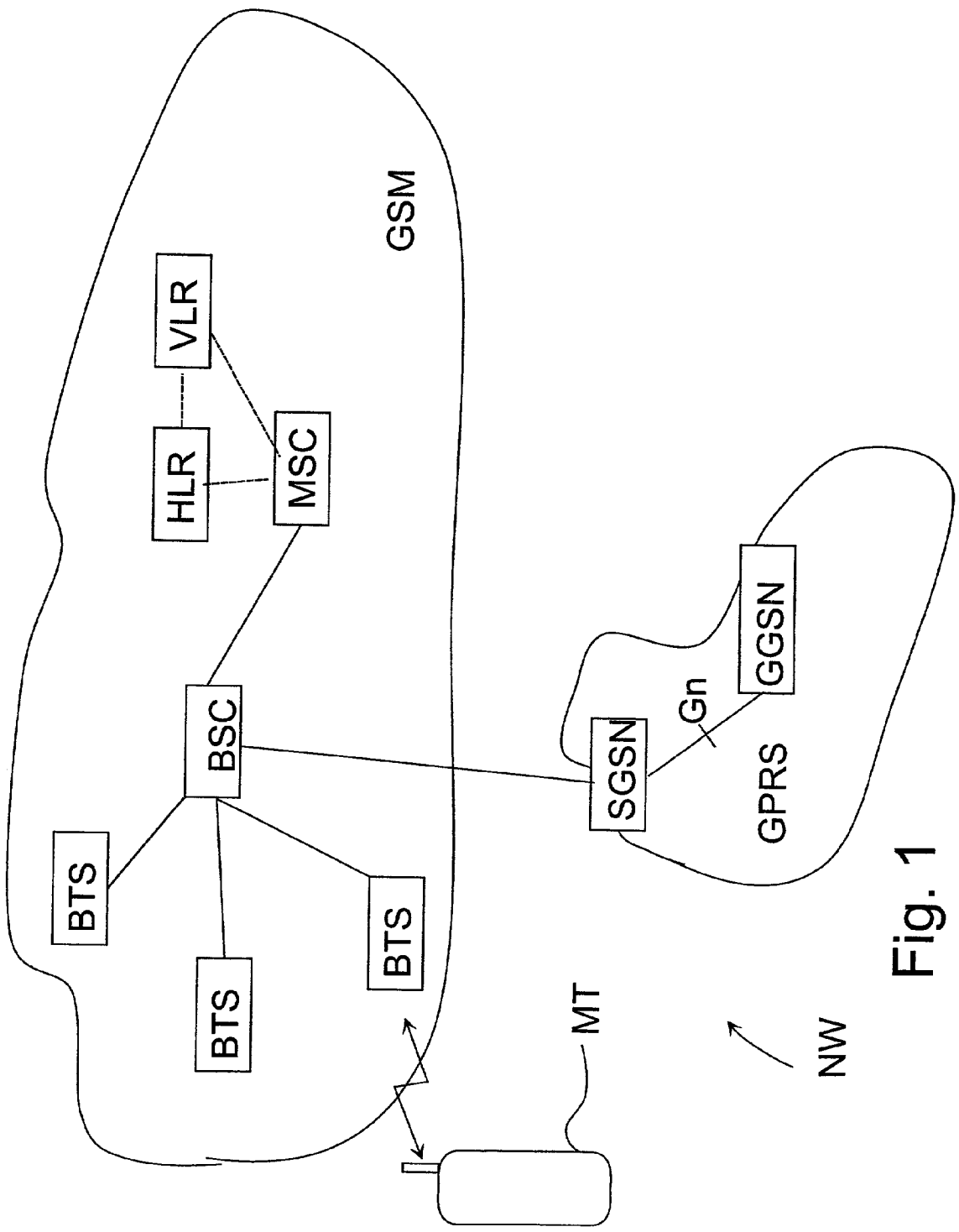
FIG. 1 shows a system according to a preferred embodiment of the invention in a reduced chart.

FIG. 1 shows, in a reduced chart, a system complying with a preferred embodiment of the invention. The system comprises at least one mobile communication network NW with base transceiver stations BTS. Thus, the operating range of one base station BTS is called a cell. In the mobile communication network NW, at least one cell has the option of forming two or more connections with different properties, such as a circuit switched connection and a packet switched connection. The circuit switched connection may be a conventional circuit switched connection, but for some mobile communication networks, also a high speed circuit switched data (HSCSD) connection has been developed, to be used for setting up e.g. video calls. It is obvious that in connection with applying the method of the invention, it is also possible to examine other properties of the mobile communication network than those mentioned above. For example, it is possible to determine so-called quality of service (QoS) parameters which can be used e.g. in the UMTS mobile communication networks under development, employing a wideband code division multiple access (WCDMA) radio interface to implement connections with different properties. The system also comprises positioning means for determining the location of the mobile terminal MT. These positioning means can be implemented e.g. in the mobile communication network, or satellite-based positioning can be used, wherein a positioning receiver is arranged in or in connection with the mobile terminal MT.

Figure 2:
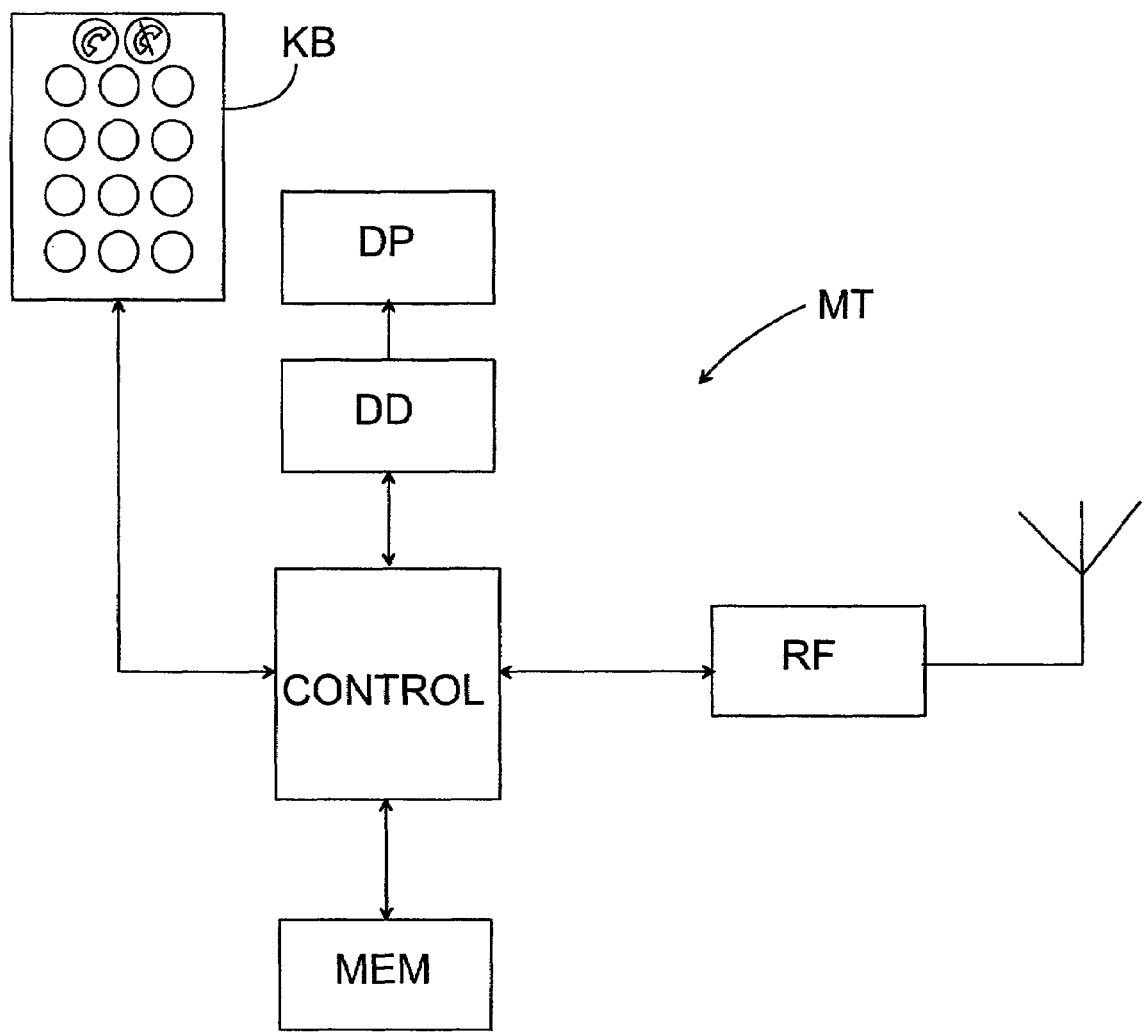
FIG. 2 shows a mobile terminal according to a preferred embodiment of the invention in a reduced block chart.

As an example of the mobile terminal MT, a mobile communication device is used, having the facility to use a circuit switched connection and a packet switched connection. Furthermore, the mobile terminal MT may have data processing properties, such as means to run application programs. FIG. 2 shows such a terminal MT in a reduced block chart. FIG. 2 shows primarily functional blocks necessary for describing the invention, but it is obvious that in practical applications, the mobile terminal MT may also have other functions which are not shown in FIG. 2. The mobile terminal MT has a processor block CONTROL which can be implemented with one or more processors, such as a microprocessor, a digital signal processing unit, etc., which is known as such. This processor block CONTROL can also be formed as a part of a so-called application specific integrated circuit (ASIC) in which also other functions of the mobile terminal MT can be implemented. For storing data, the mobile terminal MT has a memory MEM, such as a read-only memory, a random access memory, and/or a nonvolatile random access memory. A radio part RF comprises the necessary means for implementing radio communication with the base transceiver station BTS. Further, the mobile terminal MT preferably comprises a keyboard KB, a display DP, and a display driver DD. In practice, the mobile terminal MT can be implemented in several different ways. The mobile terminal MT is, for example, a wireless communication device with data processing properties, such as Nokia 9210 Communicator, or the wireless terminal MT consists of a mobile terminal and a data processor which are arranged in a data transmission connection with each other. An example of this is shown in a reduced manner in the appended FIG. 2b. In FIG. 2b, the data transmission connection is illustrated with an arrow marked with the reference LINK. In practical applications, this data transmission connection may be a cabled connection or a wireless connection, such as an infrared connection or a radio connection. Yet another example of such a mobile terminal MT is a portable computer to which is coupled a card-like wireless communication device, such as a GSM mobile communication device. The mobile terminal MT comprises means for setting up both a circuit switched connection (CS) and a packet switched connection to a mobile communication network NW1.

The mobile terminals MS communicate with the base transceiver stations BTS via an air interface (radio interface). The base transceiver stations are controlled by base station controllers BSC which communicate with a mobile switching centre MSC. The base station controller BSC and the connected base stations BTS are also called a base station subsystem (BSS). In the circuit switched connection, the data transmission between the mobile terminal MS and the mobile communication network NW takes place via the mobile switching centre MSC and the base station subsystem BSS. In a corresponding manner, in packet switched communication, a serving support node SGSN is used, which communicates with the base station controller BSC. The mobile switching centre MSC takes care of e.g. the control of incoming and outgoing calls in the same way as the switching centre of a public switched telephone network (PSTN; not shown). Moreover, the mobile switching centre MSC takes care of the operations required in mobile phone traffic, such as the control of the location of the mobile terminal e.g. by means of a home location register HLR and a visitor location register VLR. Via the mobile switching centre MSC, it is also possible to set up a circuit switched connection to a data network, such as the Internet data network (not shown).

Figure 3:
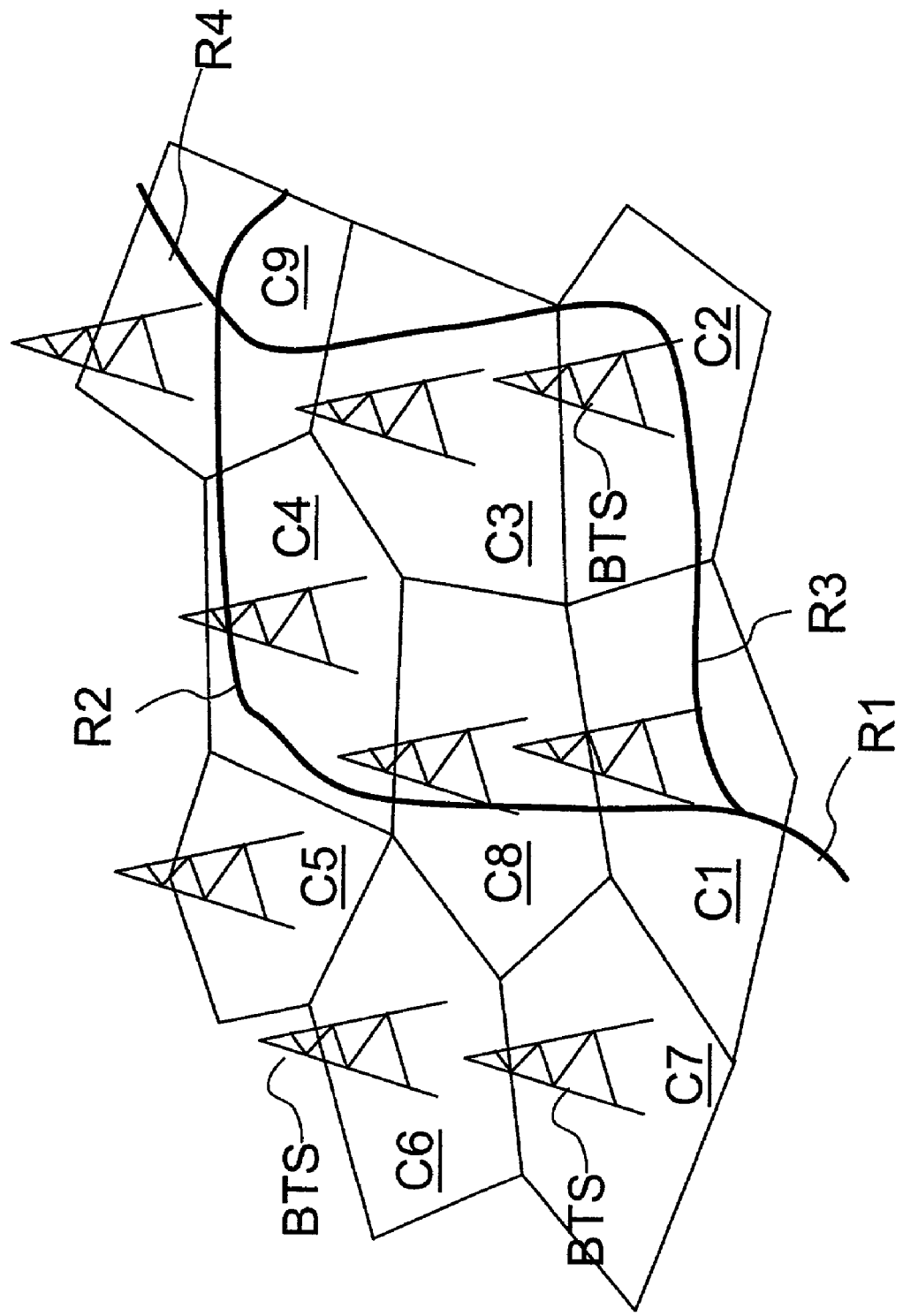
FIG. 3 illustrates, in a reduced view, the displaying of information determined by the method according to an advantageous embodiment of the invention in a mobile terminal.
Figure 4:
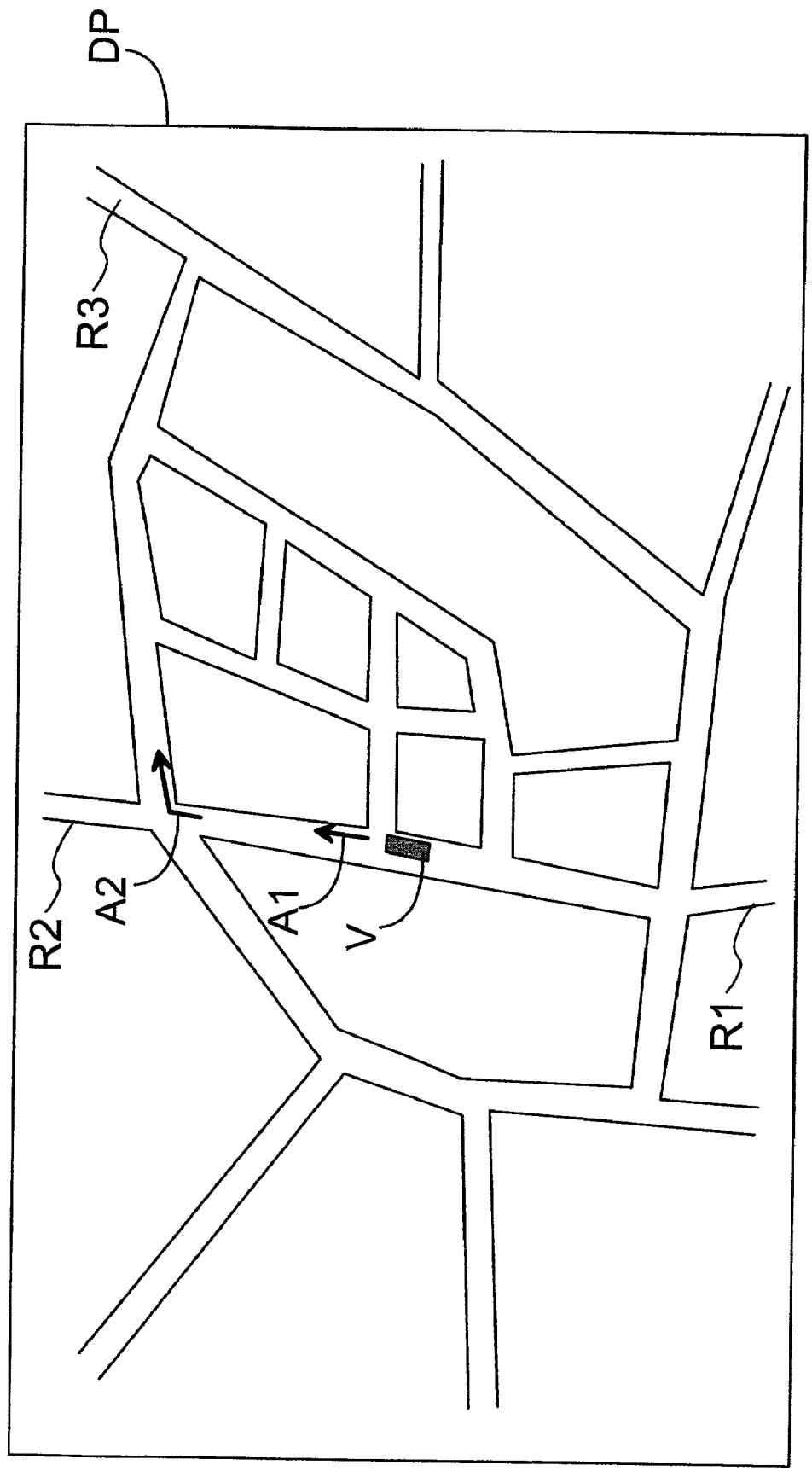
FIG. 4 illustrates, in a reduced manner, the application of the invention in selecting a travel route.

In the following, the operation of the method according to a preferred embodiment of the invention will be described with reference to FIGS. 3 and 4. FIG. 3 shows a part of a mobile communication network NW and its base transceiver stations BTS. In the figure, references C1 to C9 indicate cells, each of which form the operating range of one base transceiver station BTS. The figure also shows roads R1 to R4 which are located along or in the vicinity of the user's proposed travel route. FIG. 4 shows, as an example, an enlargement of a road network to be displayed on the display DP of the mobile terminal, for the part of a first road R1, a second road R2, and a third road R3. Let us assume that the user is moving with a vehicle V along the first road R1 (FIG. 4).

In the system, the location of the user's mobile terminal MT is determined at intervals, so that the system knows where the user's mobile terminal MT is located each time. This positioning can be made, for example, by means of the mobile communication network NW by using, as the positioning data, the location of the base station with which the mobile terminal MT communicates, or by receiving a signal transmitted by the mobile terminal MT in preferably three different base stations and by determining the differences in the signal transmission time from the mobile terminal MT to the different base stations BTS. A higher precision can be achieved by this latter method than by the first mentioned method. In the positioning, it is also possible to use a positioning receiver (not shown) which can be in connection with the mobile terminal MT or in connection with the vehicle V. Thus, the positioning receiver determines the location, for example, by means of a positioning system based on satellites, in a way known as such. From the positioning receiver, the position data is transmitted to the mobile terminal MT which, in a preferred embodiment of the invention, transmits the position data to the mobile communication network NW. The invention can also be applied by using the positioning data in the mobile terminal MT, as will be disclosed below in this description. For example, a packet switched connection is activated in the mobile terminal MT, wherein data can be transmitted in packets between the mobile communication system NW and the mobile terminal MT in a way known as such. Let us assume that the cells C1, C2, C3 and C9 of the mobile communication network support packet data transmission of class A, but in cells C4 and C8, only a packet connection of class C is available. In addition, if the mobile terminal MT has e.g. a voice call active, or if the user intends to start a voice call, or there an incoming voice call for the mobile terminal MT, the method of the invention can be used to take into account the properties of the different cells and the services required by the mobile terminal MT preferably in the following way. As one property of the cells, it is also possible to use signal strength in the cell and/or in different areas of the cell.

In the mobile terminal MT, the properties of the cells in the vicinity are determined for example by transmitting an inquiry message or the like from the mobile terminal MT to the mobile communication network NW. If necessary, the inquiry message also contains information about the current location of the mobile terminal MT, or the mobile communication network NW determines the location of the mobile terminal MT. After this, the system examines which cells are in the vicinity of the mobile terminal MT and transmits information about the properties of these cells to the mobile terminal MT. For example, in the situation of FIG. 3, information about the properties of the cells C1, C2, C3, C7, C8 is transmitted. In practical applications of the method of the invention, it is preferably possible to determine, about how large an area cell information is to be transmitted. Upon transmitting information on the cells, it is also possible to take into account the direction of movement of the mobile terminal MT, wherein information is not necessarily transmitted on cells which are in a direction substantially opposite to the direction of movement of the mobile terminal MT. Furthermore, it can be taken into account, about which cells information has been transmitted already, wherein it is not necessary to retransmit information which already exists in the mobile terminal MT. In the mobile terminal MT, the received cell property information is stored and compared with the property data required by the mobile terminal MT. In the above-presented example situation, the cell C8 does not make a circuit switched connection and a simultaneous packet switched connection possible, but this is possible in the cells C1, C2, C3 and C9. Thus, the user is informed about such a situation. In addition, the user can be informed about the cells in the neighbouring area in which such a simultaneous connection is possible, whereby the user can select his/her travel route on the basis of this information. The information about the properties of the cells is preferably presented on the display DP, for example graphically in a map form, as text in a list form, and/or in another corresponding way. In some applications, the information can be presented in audio format in addition to or instead of the visual format. On the display DP, a map can be displayed, depicting a road network as well as areas covered by cells. Thus, the user him/herself can determine which travel route is the most advantageous at the time, to prevent disconnections. On the other hand, also this travel route can be determined in the mobile terminal MT, if the mobile terminal MT has access to map information about the road network. FIG. 4 illustrates a situation in which arrows A1, A2 are shown to the user to indicate along which route the user should proceed. The map and the locations of the arrows A1, A2 are changed as the user proceeds on the route.

The above description dealt with a situation in which the user can, during the travel, affect his/her travel route, for example when travelling by a taxi or another car. The invention can also be applied when the user is travelling in a vehicle with a fixed travel route. Such vehicles include many public service vehicles, such as trains and buses. Thus, the movement of the mobile terminal MT and the properties of the cells in the neighbouring area are examined in the mobile terminal MT. In a situation, in which the mobile terminal MT is moving into the range of such a cell in which all the connections active in the mobile terminal MT cannot be maintained, the user is informed of this in advance. On the basis of the change in the movement of the mobile terminal MT, it is possible to calculate the time within which the cell will probably change. Thus, said notice may also include information about this time, wherein the user can start to prepare a controlled disconnection and/or interruption of the connections well in advance. On the other hand, the user may, on the basis of this information, consider whether to set up, yet, a connection which will probably be disconnected within the given time, or whether to postpone the setting up of the connection. If the mobile terminal MT has access to information about the route of the vehicle used by the user, e.g. information about the location of a railway line, this information can also be utilized in this situation to determine, through which cells the user's travel route will proceed and to estimate the changes in the services of the available mobile communication network. The notification message to the user can be presented in a way known as such, for example in a notification window formed on the display.

Information about the properties of the cells is stored in the mobile communication network NW. In addition, this information can also be stored in the mobile terminal MT preferably when the user travels in the range of the mobile communication network NW. In addition, information can be transferred to the mobile terminal MT in other situations as well, for example when the mobile terminal MT is turned on. Thus, the information is available already before the travel, e.g. at the stage of planning of the travel route. Furthermore, in such a situation of turning on, the user can be presented with information about the services currently available in the user's mobile terminal MT, wherein the user can take this into account when using the mobile terminal MT.

The method according to the invention can also be applied in such a situation in which the user intends to start an application which requires properties which are not available in that cell of the mobile communication network in which the user's mobile terminal MT is currently located. Thus, the user can examine the information about the cells of the mobile communication network stored in the mobile terminal MT, to find out the location of a cell where the application can be started. The user can thus move into the range of such a cell for the time of running the application, even though the user would not have any other need to move to another location.

The method according to the invention can be largely implemented by software, as program commands in the processor block CONTROL in the mobile terminal MT.

Although, in the above description of the invention, most of the different steps of the method were taken in the mobile terminal MT, the invention can also be applied in such a way that the travel route of the mobile terminal MT as well as information about the properties of the cells on the travel route are examined e.g. in the mobile communication network. Information about a change in the properties of the cells is thus transmitted, if necessary, to the mobile terminal MT, in which the user is informed of these changes.

The present invention is not limited solely to the above-presented embodiments, but it can be modified within the scope of the appended claims.

The invention claimed is:

1. A method comprising:
   determining the location and direction of movement of a mobile terminal,
   examining properties of a communication network that includes at least two base transceiver stations which form at least two cells whose properties affect an application to be operated in the mobile terminal,
   transmitting information about at least one of said properties to the mobile terminal,
   using said information to determine whether said properties enable to start an application program existing in the mobile terminal by comparing said information with a property data defined for said application,
   selecting the cells, whose properties are determined, on the basis of the direction of movement of the mobile terminal, and
   facilitating selecting a travel route of the mobile terminal to one cell of the at least two cells if the application program can be run at the one cell.

2. The method according to claim 1, wherein the properties of at least one other cell close to the location of the mobile terminal are also determined, and information on this is transmitted to the mobile terminal.

3. The method according to claim 1, wherein said cell property information is presented to the user.

4. The method according to claim 1, wherein said cell property information is used for controlling the use of functions of the mobile terminal.

5. The method according to claim 1, wherein the properties of the cell of the mobile communication network, required for the use of at least one application to be operated, are determined in the mobile terminal, and the properties of the cells in the direction of movement of the mobile terminal are compared with the properties of the cell of the mobile communication network, required for the use of said at least one application to be operated.

6. The method according to claim 5, wherein the result of the comparison is used in the selection of a travel route which is advantageous in view of the operation of the active connection.

7. The method according to claim 5, wherein if the comparison shows that the properties of the cell in the direction of movement of the mobile terminal are not suitable for using the application program active in the mobile terminal, a notification message is generated in the mobile terminal to inform about the change in the properties.

8. The method according to claim 5, wherein the result of the comparison is used in the selection of two or more travel routes which are advantageous in view of the operation of the active connection, wherein the user is informed about said advantageous travel routes.

9. The method according to claim 1, wherein in connection with turning on of the mobile terminal, the user is informed about the functions of the mobile terminal available in the cell corresponding to the location of the mobile terminal.

10. The method according to claim 1, wherein the cell properties allow at least the quality of service level to be determined.

11. A software product having a computer readable medium encoded with a software data structure for performing the method of claim 1.

12. A mobile terminal comprising:
   a receiver for receiving information about at least one property of a communication network, the communication network comprising at least two base transceiver stations which form at least two cells whose properties affect an application program to be run in the mobile terminal,
   a determination module for determining the location and the direction of movement of the mobile terminal, and
   a transmitter for transmitting data about the position of the mobile terminal to the mobile communication network which comprises means for determining said properties,
   wherein said mobile terminal is configured to use said information on the direction of movement of the mobile terminal to determine whether said properties enable to start an application program existing in the mobile terminal,
   facilitating selecting a travel route of the mobile terminal to one cell of the at least two cells if the application program can be run at the one cell.

13. The mobile terminal according to claim 12, further comprising a display for presenting said information about the cells to the user.

14. The mobile terminal according to claim 12, configured to determine the properties of the cell of the mobile communication network required for the use of at least one active function, and to compare the properties of the cells in the direction of movement of the mobile terminal with the properties of the cell of the mobile communication network required for the use of said at least one active function.

15. The mobile terminal according to claim 14, adapted to use the results of the comparison in the selection of two or more travel routes advantageous in view of the operation of the active connection, and to inform the user about said advantageous travel routes.

16. The mobile terminal according to claim 12, further comprising a presentation module configured to present said information about the cells to the user.

17. The mobile terminal of claim 12, wherein the network includes a cell where the application program can be started.

18. A method comprising:
 determining the location and direction of movement of a mobile terminal,
 examining properties of a communication network that comprises at least two base transceiver stations which form at least two cells whose properties affect an application program to be run in the mobile terminal,
 selecting the cells, whose properties are determined, on the basis of the direction of movement of the mobile terminal,
 transmitting information about at least one of said properties to the mobile terminal, wherein said information at least informs the mobile terminal of an application program that can or cannot be run in the mobile terminal, and
 facilitating selecting a travel route of the mobile terminal to one cell of the at least two cells if the application program can be run at the one cell.

19. The method of claim 18, wherein said travel route is a route for transportation of the mobile terminal.

20. A system comprising:
 a mobile terminal,
 means for informing the mobile terminal about properties of a communication network,
 wherein said communication network comprises at least two base transceiver stations which form at least two cells whose properties affect an application program to be run in the mobile terminal, wherein the system further comprises at least:
 means for determining the location and the direction of movement of the mobile terminal,
 means for examining said properties,
 means for transmitting information about at least one of said properties to the mobile terminal, wherein said information at least informs the mobile terminal of an application program that can or cannot be run in the mobile terminal; and
 means for facilitating selecting a travel route of the mobile terminal to one cell of the at least two cells if the application program can be run at the one cell.

21. A mobile terminal comprising:
 a receiver for receiving information about at least one property of a communication network, the communication network comprising at least two base transceiver stations which form at least two cells whose properties affect an application program to be run in the mobile terminal,
 a determination module for determining the location and the direction of movement of the mobile terminal,
 a transmitter for transmitting data about the position and the direction of movement of the mobile terminal to the mobile communication network which comprises means for determining said properties;
 wherein said receiver is configured to receive information about at least one of said properties, wherein said information at least informs the mobile terminal of an application program that can or cannot be run in the mobile terminal; and
 an indication module for facilitating selecting a travel route of the mobile terminal to one cell of the at least two cells if the application program can be run at the one cell.

22. A mobile terminal comprising:
 means for receiving information about at least one property of a communication network, the communication network comprising at least two base transceiver stations which form at least two cells whose properties affect an application program to be run in the mobile terminal, the current serving base station being arranged to be at least one base station through which the connection between the mobile terminal and the communication network is arranged to be maintained, and the mobile terminal further comprising:
 means for determining the location and the direction of movement of the mobile terminal, and
 means for transmitting data about the position of the mobile terminal to the mobile communication network which comprises an examining module for determining said properties,
 wherein said mobile terminal is configured to use said information on the direction of movement of the mobile terminal to determine whether said properties enable to start an application program existing in the mobile terminal, and
 wherein said mobile terminal is further configured to facilitate selecting a travel route of the mobile terminal to one cell of the at least two cells if the application program can be run at the one cell.

23. A system comprising:
 a mobile terminal,
 means for informing the mobile terminal about properties of a communication network wherein said communication network comprises at least two base transceiver stations which form at least two cells whose properties affect an application program to be run in the mobile terminal, wherein the system further comprises at least:
 means for determining the location and the direction of movement of the mobile terminal,
 means for examining said properties, and means for transmitting information about at least one of said properties to the mobile terminal, wherein the system is configured to use said information to determine whether said properties enable to start an application program existing in the mobile terminal,
 means for facilitating selecting a travel route of the mobile terminal to one cell of the at least two cells if the application program can be run at the one cell,
 wherein the means for examining the properties of at least the cell corresponding to the location of the mobile terminal are configured for selecting the cells to be determined on the basis of the direction of movement of the mobile terminal.

24. A mobile terminal comprising:
 means for receiving information about at least one property of a communication network, the communication network comprising at least two base transceiver stations which form at least two cells whose properties affect an application program to be run in the mobile terminal,
 means for determining the location and the direction of movement of the mobile terminal,
 means for transmitting data about the position and the direction of movement of the mobile terminal to the mobile communication network which comprises means for determining said properties;
 means for receiving information about at least one of said properties, wherein said information at least informs the mobile terminal of an application program that can or cannot be run in the mobile terminal; and
 means for facilitating selecting a travel route of the mobile terminal to one cell of the at least two cells if the application program can be run at the one cell.

25. A method comprising:
 determining the location and direction of movement of a mobile terminal, transmitting data about the position and the direction of movement of the mobile terminal to a mobile communication network, the communication network comprising at least two base transceiver stations which form at least two cells whose properties affect an application program to be run in a mobile terminal;

receiving information about at least one of said properties, wherein said information at least informs the mobile terminal of an application program that can or cannot be run in the mobile terminal; and facilitating selecting a travel route of the mobile terminal to one cell of the at least two cells if the application program can be run at the one cell.

26. A method comprising:

determining the location and the direction of movement of the mobile terminal, transmitting data about the position and the direction of movement of the mobile terminal to a mobile communication network that includes at least two base transceiver stations which form at least two cells whose properties affect an application program to be run in the mobile terminal,;

receiving by a mobile terminal information about at least one property of a communication network using the received information to determine whether said properties enable to start an application program existing in the mobile terminal, and selecting the cells to be determined on the basis of the direction of movement of the mobile terminal; and facilitating selecting a travel route of the mobile terminal to one cell of the at least two cells if the application program can be run at the one cell.

* * * * *